(12) United States Patent  
Okada et al.

(10) Patent No.: US 12,512,568 B2  
(45) Date of Patent: Dec. 30, 2025

(54) TERMINAL STRUCTURE AND POWER STORAGE DEVICE

(71) Applicant: SANYO Electric Co., Ltd., Osaka (JP)

(72) Inventors: Mitsuhiro Okada, Hyogo (JP); Hitoshi Maeda, Hyogo (JP); Hiroshi Takabayashi, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 656 days.

(21) Appl. No.: 17/778,318

(22) PCT Filed: Nov. 12, 2020

(86) PCT No.: PCT/JP2020/042223  
§ 371 (c)(1),  
(2) Date: May 19, 2022

(87) PCT Pub. No.: WO2021/106595  
PCT Pub. Date: Jun. 3, 2021

(65) Prior Publication Data  
US 2022/0399620 A1 Dec. 15, 2022

(30) Foreign Application Priority Data

Nov. 26, 2019 (JP) ................................. 2019-213708

(51) Int. Cl.  
*H01M 50/588* (2021.01)  
*H01G 11/74* (2013.01)  
(Continued)

(52) U.S. Cl.  
CPC .......... *H01M 50/588* (2021.01); *H01G 11/74* (2013.01); *H01G 11/80* (2013.01);  
(Continued)

(58) Field of Classification Search  
CPC .. H01M 50/588; H01M 50/15; H01M 50/176; H01M 50/531; H01M 50/557;  
(Continued)

(56) References Cited

U.S. PATENT DOCUMENTS

| | | | | |
|---|---|---|---|---|
| 2010/0227212 A1* | 9/2010 | Kim | ............... | H01M 50/147 429/158 |
| 2012/0021278 A1* | 1/2012 | Byun | ............... | H01M 50/103 429/179 |

(Continued)

FOREIGN PATENT DOCUMENTS

| | | |
|---|---|---|
| CN | 102646808 A | 8/2012 |
| CN | 205178423 U | 4/2016 |

(Continued)

OTHER PUBLICATIONS

Extended European Search Report dated Jan. 16, 2023 issued in the corresponding European Patent Application No. 20893793.8.

(Continued)

*Primary Examiner* — Adam J Francis  
(74) *Attorney, Agent, or Firm* — Rimon P.C.

(57) ABSTRACT

A terminal structure to be adopted for a power storage device including an outer case that has an opening, includes: a sealing plate sealing the opening; a terminal member inserted into a terminal hole formed in the sealing plate and electrically connected to an electrode; and a first insulating member arranged between the sealing plate and the terminal member, and arranged on an outer surface side of the sealing plate facing an outer side of the power storage device. The terminal member has a first extended part extending further outward than an outer periphery of the terminal hole on the outer side of the power storage device. A first protruding part or a second recessed part provided to the first insulating member and a first recessed part or a second protruding part (Continued)

provided to the sealing plate or to the first extended part fit with each other.

13 Claims, 6 Drawing Sheets

(51) Int. Cl.

| | | |
|---|---|---|
| *H01G 11/80* | (2013.01) | |
| *H01G 11/82* | (2013.01) | |
| *H01M 50/15* | (2021.01) | |
| *H01M 50/176* | (2021.01) | |
| *H01M 50/531* | (2021.01) | |
| *H01M 50/557* | (2021.01) | |
| *H01M 50/586* | (2021.01) | |
| *H01M 50/593* | (2021.01) | |

(52) U.S. Cl.
CPC ............ *H01G 11/82* (2013.01); *H01M 50/15* (2021.01); *H01M 50/176* (2021.01); *H01M 50/531* (2021.01); *H01M 50/557* (2021.01); *H01M 50/586* (2021.01); *H01M 50/593* (2021.01)

(58) Field of Classification Search
CPC ............ H01M 50/586; H01M 50/593; H01M 50/188; H01M 50/553; H01M 50/566; H01M 50/172; H01M 50/147; H01M 50/543; H01M 50/55; H01M 50/562; H01M 50/567; H01G 11/74; H01G 11/80; H01G 11/82; H01G 11/78; Y02E 60/10; Y02T 10/70
See application file for complete search history.

(56) References Cited

U.S. PATENT DOCUMENTS

| | | | | |
|---|---|---|---|---|
| 2012/0214053 | A1* | 8/2012 | Kim | .................. H01M 50/147 |
| | | | | 429/182 |
| 2014/0322566 | A1* | 10/2014 | Kim | .................. H01M 50/271 |
| | | | | 429/82 |
| 2016/0254517 | A1* | 9/2016 | Tsunaki | .............. H01M 50/176 |
| | | | | 429/179 |
| 2017/0062779 | A1* | 3/2017 | Byun | .................. H01M 50/176 |
| 2017/0163059 | A1* | 6/2017 | Tamaru | .................. H01G 11/74 |
| 2019/0221822 | A1 | 7/2019 | Wakimoto | |
| 2019/0273277 | A1* | 9/2019 | Wakimoto | ............ H01M 50/55 |
| 2019/0296317 | A1* | 9/2019 | Sakurai | .................. H01M 4/48 |
| 2021/0104796 | A1* | 4/2021 | Wakimoto | .......... H01M 50/176 |

FOREIGN PATENT DOCUMENTS

| | | | | |
|---|---|---|---|---|
| CN | 105576160 A | * | 5/2016 | |
| JP | 2012-174684 A | | 9/2012 | |
| JP | 2015-035303 A | | 2/2015 | |
| JP | 2019-125493 A | | 7/2019 | |
| JP | 2019-169269 A | | 10/2019 | |
| NO | 2013/125153 A1 | | 8/2013 | |
| WO | WO-2013125153 A1 | * | 8/2013 | ............. H01G 11/74 |
| WO | WO-2018180749 A1 | * | 10/2018 | .......... H01M 50/209 |

OTHER PUBLICATIONS

Indian Office Action dated Sep. 16, 2022 issued in the corresponding Indian Patent Application No. 202247031069, with English translation.
International Search Report issued in International Patent Application No. PCT/JP2020/042223, dated Jan. 12, 2021, with English translation.
Hearing Notice dated Mar. 20, 2024 issued in the corresponding Indian Patent Application No. 202247031069, with English translation.

* cited by examiner

TERMINAL STRUCTURE AND POWER STORAGE DEVICE

CROSS-REFERENCE OF RELATED APPLICATIONS

This application is the U.S. National Phase under 35 U.S.C. § 371 of International Patent Application No. PCT/JP2020/042223, filed on Nov. 12, 2020, which in turn claims the benefit of Japanese Patent Application No. 2019-213708, filed on Nov. 26, 2019, the entire disclosures of which Applications are incorporated by reference herein.

TECHNICAL FIELD

The present disclosure relates to a terminal structure and a power storage device.

BACKGROUND

Power storage devices such as secondary batteries and capacitors are used as power sources for driving vehicles such as electric vehicles (EV) and hybrid electric vehicles (HEV). In such power storage devices, a metal case made of aluminum or the like may be used as the outer case for the sake of mechanical strength and the like, and an outer terminal has a shape that protrudes outward from the metal case. In this case, an insulating member is interposed between the outer terminal and the metal case to electrically insulate the outer terminal from the metal case.

For example, Patent Document 1 discloses a terminal structure of a power storage device as follows. Namely, a first insulating member is arranged between an inner surface of a lid member and a base part of a terminal member. A second insulating member is arranged between an outer surface of the lid member and a fixing member, and between an inner surface of a communication hole of the lid member and a protruding part of the terminal member. This structure achieves insulation between the lid member and the terminal member and interposes a spacer member made of a metal or ceramic at least between the inner surface of the lid member and the first insulating member or between the outer surface of the lid member and the second insulating member. This is for having the spacer member as a thermal mass increasing the interface where contact thermal resistance occurs, and suppressing heat transfer from an outer edge part of the lid member, which is a position to be welded with the case to the insulating member, thereby keeping the insulating member from being molten.

CITATION LIST

Patent Documents

PATENT DOCUMENT 1: Japanese Unexamined Patent Publication No. 2015-35303

SUMMARY OF THE INVENTION

The terminal structure disclosed in Patent Document 1 requires the spacer member in addition to the first insulating member and the second insulating member. This increases the number of members and therefore increases the costs. The structure further requires a separate rotation stopper to keep the terminal member from being tilted or rotated at a time of fixing the terminal member to the lid member. This further causes an increase in the costs and makes the structure complicated.

A terminal structure of the present disclosure to be adopted for a power storage device including an outer case that has an opening and accommodates therein an electrode, includes: a sealing plate sealing the opening; a terminal member inserted into a terminal hole formed in the sealing plate and electrically connected to the electrode; and a ceramic-made first insulating member arranged between and electrically insulating the sealing plate and the terminal member from each other. The first insulating member is arranged on an outer surface side of the sealing plate facing an outer side of the power storage device. The terminal member has a first extended part extending further outward than an outer periphery of the terminal hole on the outer side of the power storage device. A first protruding part provided to the first insulating member and a first recessed part provided to the sealing plate or to the first extended part fit with each other, or a second recessed part provided to the first insulating member and a second protruding part provided to the sealing plate or to the first extended part fit with each other. The "extending further outward than an outer periphery of the terminal hole" means extending in a direction away from the terminal hole along the outer surface (or inner surface) of the sealing plate.

The first insulating member may have a hole into which the terminal member is inserted.

The above-described structure may be such that the electrode and the terminal member are electrically connected to each other via a current collector; on an inner surface side of the sealing plate facing the inner side of the power storage device, a ceramic-made second insulating member is arranged between one of the terminal member or the current collector and the sealing plate and electrically insulating the one of the terminal member or the current collector and the sealing plate from each other; and a third protruding part provided to the second insulating member and a third recessed part provided to the sealing plate or one of the terminal member or the current collector fit with each other, or a fourth recessed part provided to the second insulating member and a fourth protruding part provided to the sealing plate or one of the terminal member or the current collector fit with each other.

A power storage device of the present disclosure includes the above-described terminal structure.

In the terminal structure of the present disclosure, the first insulating member electrically insulates the terminal member and the sealing plate from each other, and has a rotation stopper function to keep the terminal member from being tilted or rotated at a time of assembling. That is, one member has a plurality of functions. This can reduce costs for members and assembling.

DESCRIPTION OF EMBODIMENTS

Hereinafter, embodiments of the present disclosure will be described in detail with reference to the drawings. The following description of the preferred embodiments is only an example in nature, and is not intended to limit the scope, applications or use of the present disclosure. For the sake of simple description, constituting elements having substantially the same function are given the same reference characters in the following description.

First Embodiment

The following describes a structure of a rectangular secondary battery 20 as a secondary battery (power storage device) of the first embodiment. Note that the present disclosure is not limited to the following embodiment.

Figure 1:
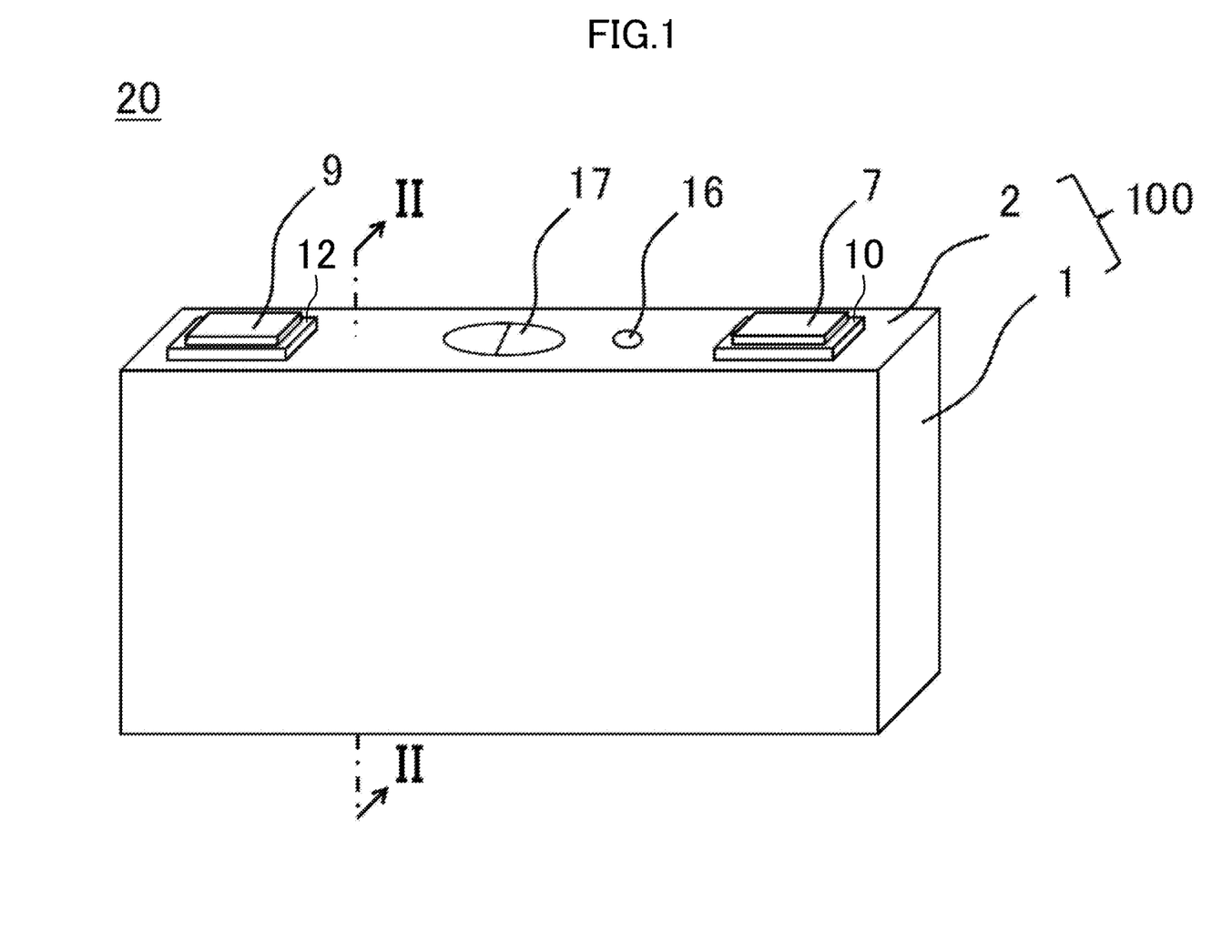
FIG. 1 is a schematic external perspective view of a secondary battery according to an embodiment.
Figure 2:
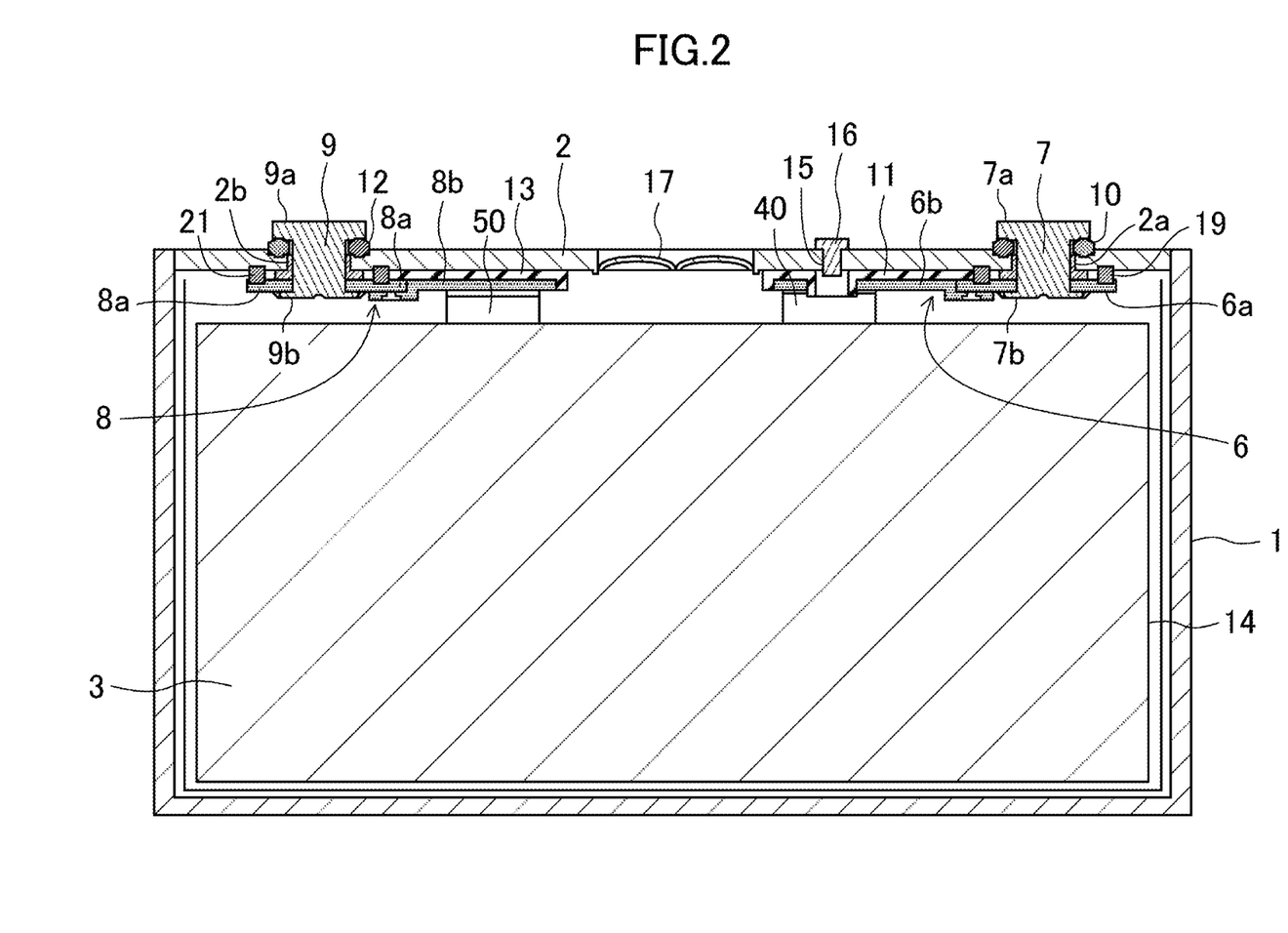
FIG. 2 is a cross-sectional view taken along line II-II of FIG. 1.
Figure 3:
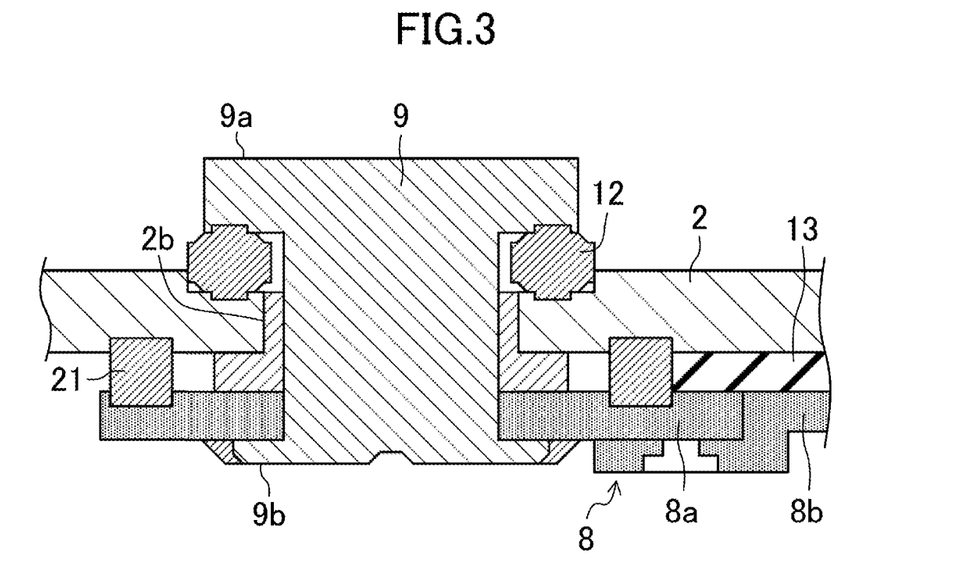
FIG. 3 is a schematic enlarged cross-sectional view providing an enlarged view nearby a negative electrode terminal shown in FIG. 2.

As shown in FIG. 1 to FIG. 3, the rectangular secondary battery 20 according to the present embodiment includes a battery case 100 having an outer case 1 having a shape like a rectangular tube with a bottom and an opening, and a sealing plate 2 sealing the opening of the outer case 1. The outer case 1 and the sealing plate 2 are each made of a metal in a preferred embodiment. The outer case 1 has a bottom plate part facing the sealing plate 2, and four side walls standing up from the bottom plate part. In the outer case 1, an electrode body 3 having a positive electrode plate and a negative electrode plate are accommodated together with an electrolyte. In the present embodiment, a liquid electrolyte is used. From an outer surface side of the sealing plate 2, a positive electrode terminal 7 and a negative electrode terminal 9 protrude. Between the positive electrode terminal 7 and the outer surface side of the sealing plate 2, a ceramic-made positive electrode side first insulating member 10 is arranged. Further, between the negative electrode terminal 9 and the outer surface side of the sealing plate 2, a ceramic-made negative electrode side first insulating member 12 is arranged. Examples of the ceramic include, but are not limited to, alumina, zirconia, titania, barium titanate, and silicon oxide.

A positive electrode terminal member constituting the positive electrode terminal 7 is inserted into a positive electrode terminal hole formed in the sealing plate 2, and has, on its outer side of the rectangular secondary battery 20, a positive electrode first extended part 7a extending further outward than the outer periphery of the positive electrode terminal hole (along the outer surface of the sealing plate 2). Further, on the inner side of the rectangular secondary battery 20, the positive electrode terminal member has a positive electrode second extended part 7b extending further outward than the outer periphery of the positive electrode terminal hole (along the inner surface of the sealing plate 2). Between the positive electrode terminal hole and the positive electrode terminal member, a positive electrode sealing member 2a is arranged.

Similarly to the positive electrode terminal member, a negative electrode terminal member constituting the negative electrode terminal 9 is inserted into a negative electrode terminal hole formed in the sealing plate 2, and has, on its outer side of the rectangular secondary battery 20, a negative electrode first extended part 9a extending further outward than the outer periphery of the negative electrode terminal hole (along the outer surface of the sealing plate 2). Further, on the inner side of the rectangular secondary battery 20, the negative electrode terminal member has a negative electrode second extended part 9b extending further outward than the outer periphery of the negative electrode terminal hole (along the inner surface of the sealing plate 2). Between the negative electrode terminal hole and the negative electrode terminal member, a negative electrode sealing member 2b is arranged.

An end portion of the electrode body 3 on the side of the sealing plate 2 has a positive electrode tab group 40 including a plurality of positive electrode tabs and a negative electrode tab group 50 including a plurality of negative electrode tabs. The positive electrode tab group 40 is electrically connected to the positive electrode second extended part 7b of the positive electrode terminal 7 via a first positive electrode current collector 6a and a second positive electrode current collector 6b. The negative electrode tab group 50 is electrically connected to the negative electrode second extended part 9b of the negative electrode terminal 9 via a first negative electrode current collector 8a and a second negative electrode current collector 8b.

The first positive electrode current collector 6a, the second positive electrode current collector 6b, and the positive electrode terminal 7 are made of preferably metal, more preferably aluminum or an aluminum alloy. Between the positive electrode terminal 7 and the outer surface side of the sealing plate 2, the ceramic-made positive electrode side first insulating member 10 is arranged. Between the sealing plate 2 and the first positive electrode current collector 6a and the second positive electrode current collector 6b, a resin-made inner side insulation member 11 is arranged.

The first negative electrode current collector 8a, the second negative electrode current collector 8b, and the negative electrode terminal 9 are made of preferably metal, more preferably copper or a copper alloy. Further, the negative electrode terminal 9 has a portion made of aluminum or an aluminum alloy and a portion made of a copper or a copper alloy in a preferred embodiment. In this case, the portion made of copper or a copper alloy is connected to the first negative electrode current collector 8a, and the portion made of the aluminum or an aluminum alloy protrudes further outward than the sealing plate 2, in a preferred embodiment. Between the negative electrode terminal 9 and the outer surface side of the sealing plate 2, the ceramic-made negative electrode side first insulating member 12 is arranged. Between the sealing plate 2 and the first negative electrode current collector 8a and the second negative electrode current collector 8b, a resin-made inner side insulation member 13 is arranged.

Further, on the inner surface side of the sealing plate 2, a ceramic-made positive electrode side second insulating member 19 is arranged between the inner surface of the sealing plate 2 and the first positive electrode current collector 6a so as to electrically insulate the sealing plate 2 from the first positive electrode current collector 6a on the inner surface side. Further, a ceramic-made negative electrode side second insulating member 21 is arranged between the inner surface of the sealing plate 2 and the first negative electrode current collector 8a so as to electrically insulate the sealing plate 2 from the first negative electrode current collector 8a on the inner surface side.

Between the electrode body 3 and the outer case 1, an insulating holder 14 made of a resin-made resin sheet is arranged. The insulating holder 14 is formed by bending the resin-made insulation sheet in a box-like shape. The insulating holder 14 maintains a state in which the electrode body 3 and the outer case 1 are reliably electrically insulated from each other.

The sealing plate 2 is provided with an electrolyte liquid injection hole 15, and the electrolyte liquid injection hole 15 is sealed with a sealing member 16. The sealing plate 2 is provided with a gas discharge valve 17 that breaks when the pressure inside the battery case 100 reaches or surpasses a predetermined value to discharge the gas inside the battery case 100 to the outside of the battery case 100.

Next, the following describes a method of manufacturing the rectangular secondary battery 20 and details of each structure.

[Positive Electrode Plate]

First, a method for manufacturing a positive electrode plate will be described.

[Preparation of Positive Electrode Active Material Mixture Layer Slurry]

Lithium nickel cobalt manganese composite oxide as a positive electrode active material, polyvinylidene fluoride (PVdF) as a binder, a carbon material as a electroconductive material, and N-methyl-2-pyrrolidone (NMP) as a dispersion medium are kneaded at a mass ratio of lithium nickel cobalt manganese composite oxide:PVdF:carbon material of 97.5:1:1.5. Thus, a positive electrode active material mixture layer slurry is prepared.

[Preparation of Positive Electrode Protective Layer Slurry]

An alumina powder, graphite as an electroconductive material, polyvinylidene fluoride (PVdF) as a binder, and N-methyl-2-pyrrolidone (NMP) as a dispersion medium are kneaded at a mass ratio of alumina powder:graphite:PVdF of 83:3:14. Thus, a protective layer slurry is prepared.

[Formation of Positive Electrode Active Material Mixture Layer and Positive Electrode Protective Layer]

To both surfaces of an aluminum foil having a thickness of 15 μm as a positive electrode core, the positive electrode active material mixture layer slurry and the positive electrode protective layer slurry produced as described above are applied using a die coater. At this time, the positive electrode active material mixture layer slurry is applied to a width-directionally middle of the positive electrode core. Further, the positive electrode protective layer slurry is applied to width-directionally both ends of the region where the positive electrode active material mixture layer slurry is applied.

The positive electrode core with the positive electrode active material mixture layer slurry and the positive electrode protective layer slurry applied thereon is dried and to remove NMP in the slurries. In this way, the positive electrode active material mixture layer and the protective layer are formed. Thereafter, the positive electrode active material mixture layer is compressed by passing it between a pair of press rollers to form a positive electrode pre-cut plate. The positive electrode pre-cut plate is then cut into a predetermined size to complete a positive electrode plate. The positive electrode plate has such a shape that a positive electrode tab protrudes from one end of the rectangular positive electrode core, and that the positive electrode active material mixture layer is formed in the rectangular portion of the positive electrode core.

[Negative Electrode Plate]

Next, a method for manufacturing a negative electrode plate will be described.

[Preparation of Negative Electrode Active Material Mixture Layer Slurry]

Graphite as a negative electrode active material, styrene-butadiene rubber (SBR) and carboxymethyl cellulose (CMC) as a binder, and water as a dispersion medium are kneaded at a mass ratio of graphite:SBR:CMC of 98:1:1. Thus, a negative electrode active material mixture layer slurry is prepared.

[Formation of Negative Electrode Active Material Mixture Layer]

To both surfaces of a copper foil having a thickness of 8 μm as a negative electrode core, the negative electrode active material mixture layer slurry produced as described above is applied using a die coater.

The negative electrode core with the negative electrode active material mixture layer slurry applied thereon is dried to remove water in the slurry. In this way, the negative electrode active material mixture layer is formed. Thereafter, the negative electrode active material mixture layer is compressed by passing it between a pair of press rollers to form a negative electrode pre-cut plate. The negative electrode pre-cut plate is then cut into a predetermined size to complete a negative electrode plate. The negative electrode plate has such a shape that a negative electrode tab protrudes from one end of the rectangular negative electrode core, and that the negative electrode active material mixture layer is formed in the rectangular portion of the negative electrode core.

[Production of Electrode Body]

The positive electrode plate and the negative electrode plate produced in the method described above are stacked with a separator therebetween, to form a stacked-type electrode body 3. An end portion of the electrode body 3 has the positive electrode tab group 40 including a plurality of positive electrode tabs and the negative electrode tab group 50 including a plurality of negative electrode tabs.

[Connection Between Current Collector and Tab]

The positive electrode tab group 40 of the electrode body 3 is connected to the second positive electrode current collector 6b, and the negative electrode tab group 50 of the electrode body 3 is connected to the second negative electrode current collector 8b. To connect these members, ultrasonic welding, resistance welding, laser welding, or the like may be adopted.

[Attachment of Components to Sealing Plate]

The positive electrode side first insulating member 10 is arranged on the battery outer surface side around the positive electrode terminal insertion hole of the sealing plate 2. The inner side insulation member 11 and the first positive electrode current collector 6a are arranged on a battery inner surface side around the positive electrode terminal insertion hole of the sealing plate 2. Then, the positive electrode terminal 7 is inserted, from the battery outer side, into an insertion hole of the positive electrode side first insulating member 10, the positive electrode terminal insertion hole of the sealing plate 2, a through hole of the inner side insulation member 11, and a terminal connection hole of the first positive electrode current collector 6a. Then, the distal end on the battery inner side of the positive electrode terminal 7 is crimped to the first positive electrode current collector 6a. As a result, the positive electrode second extended part 7b is formed, and the positive electrode terminal 7 and the first positive electrode current collector 6a are fixed to the sealing plate 2. Note that the crimped portion of the positive electrode terminal 7 and the first positive electrode current collector 6a are welded together in a preferred embodiment.

The negative electrode side first insulating member 12 is arranged on the battery outer surface side around the negative electrode terminal insertion hole of the sealing plate 2. The inner side insulation member 13 and the first negative electrode current collector 8a are arranged on the battery inner surface side around the negative electrode terminal insertion hole of the sealing plate 2. Then, the negative electrode terminal 9 is inserted, from the battery outer side, into an insertion hole of the negative electrode side first insulating member 12, the negative electrode terminal insertion hole of the sealing plate 2, a through hole of the inner side insulation member 13, and a terminal connection hole of the first negative electrode current collector 8a. Then, the distal end on the battery inner side of the negative electrode terminal 9 is crimped to the first negative electrode current collector 8a. As a result, the negative electrode second extended part 9b is formed, and the negative electrode terminal 9 and the first negative electrode current collector 8a are fixed to the sealing plate 2. Note that the crimped portion of the negative electrode terminal 9 and the first negative electrode current collector 8a are welded together in a preferred embodiment.

A liquid injection port is provided in a portion of the inner side insulation member 11, which faces the electrolyte liquid injection hole 15 provided to the sealing plate 2. Further, a tubular portion is provided at the rim of the liquid injection port.

[Connection Between First Current Collector and Second Current Collector]

The second positive electrode current collector 6b connected to the positive electrode tab group 40 is arranged on the inner side insulation member 11 so that the second positive electrode current collector 6b partially overlaps the first positive electrode current collector 6a. Then, laser is applied to a thin portion of the second positive electrode current collector 6b to weld-connect between the second positive electrode current collector 6b and the first positive electrode current collector 6a. Further, the second negative electrode current collector 8b connected to the negative electrode tab group 50 is arranged on the inner side insulation member 13 so that the second negative electrode current collector 8b partially overlaps the first negative electrode current collector 8a. Then, laser is applied to a thin portion of the second negative electrode current collector 8b to weld-connect the second negative electrode current collector 8b to the first negative electrode current collector 8a.

[Production of Secondary Battery]

The electrode body 3 attached to the sealing plate 2 is accommodated in the insulating holder 14 made of an insulation sheet formed in a box-like shape.

The electrode body 3 accommodated in the insulating holder 14 is inserted into the outer case 1. Then, the sealing plate 2 and the outer case 1 are welded and the opening of the outer case 1 is sealed by the sealing plate 2. Then, through the electrolyte liquid injection hole 15 provided to the sealing plate 2, an electrolyte is injected into the outer case 1. After that, the electrolyte liquid injection hole 15 is sealed by a sealing member such as a blind rivet or the like. Thus, a rectangular secondary battery 20 is completed.

<Shape of First Insulating Member>

Figure 4:
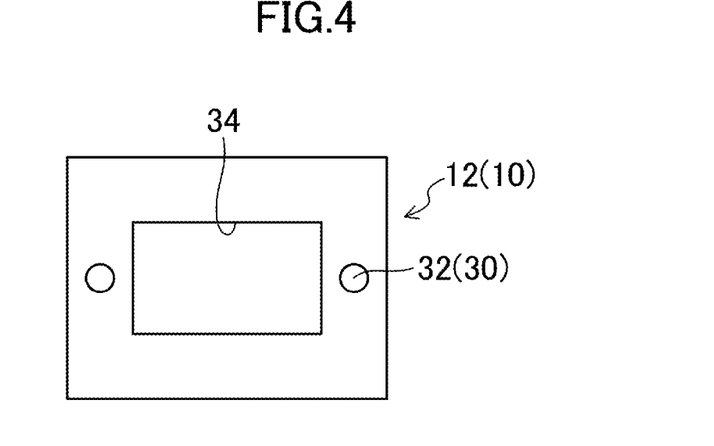
FIG. 4 is a schematic plan view of a negative electrode side first insulating member.

FIG. 4 is a schematic plan view of a negative electrode side first insulating member 12. The positive electrode side first insulating member 10 also has the same shape as the negative electrode side first insulating member 12. The negative electrode side first insulating member 12 is a ceramic-made ring-like member provided with an insertion hole 34 into which the negative electrode terminal member is inserted, and has two upper side first protruding parts 32 on its upper surface side, and two lower surface side first protruding parts (not shown) on its lower surface side. The number of the upper side first protruding parts 32 and the number of the lower side first protruding parts to achieve a rotation stopper function is at least two. Three or more upper side first protruding parts 32 and three or more lower side first protruding parts may be provided.

<Fitting of First Insulating Member, Terminal Member, and Sealing Plate>

Figure 5:
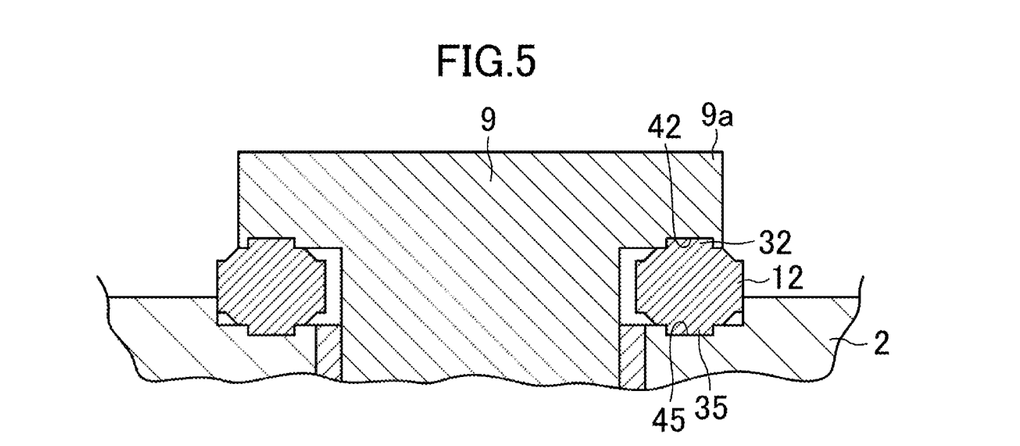
FIG. 5 is a schematic partially enlarged cross-sectional view showing fitting of the negative electrode side first insulating member, the negative electrode terminal member, and a sealing plate.

FIG. 5 is a schematic partially enlarged cross-sectional view showing fitting of the negative electrode side first insulating member 12, the negative electrode terminal member, and a sealing plate 2. In the present embodiment, the negative electrode first extended part 9a of the negative electrode terminal member has two negative electrode terminal first recessed parts 42 into which the two upper side first protruding parts 32 provided to the negative electrode side first insulating member 12 are fitted. Further, the sealing plate 2 has, on its upper surface side, two sealing plate first recessed parts 45 into which the two lower side first protruding parts 35 provided to the negative electrode side first insulating member 12 are fitted. This fitting of the recessed parts and the protruding parts achieves a rotation stopper function, that is, a function of avoiding a case where the negative electrode terminal member is attached while being tilted or rotated in the manufacturing process of the battery, thus fixing the negative electrode terminal member with a twist to the negative electrode tab. Further, the negative electrode side first insulating member 12 also has an insulating function between the negative electrode terminal member and the upper surface side of the sealing plate 2. Thus, two functions can be achieved with a single member. This reduces the number of parts and reduces the costs. Further, the manufacturing costs are also reduced because the manufacturing processes are simplified and reduced.

Second Embodiment

A secondary battery according to the second embodiment is different from the secondary battery 20 of the first embodiment only in the fitting structures of the first insulating member, the terminal member, and the sealing plate. The following therefore describes only the different parts of the structures. The structures and shapes of the secondary battery in the present embodiment are the same as those of the first embodiment except for the fitting structures of the first insulating member, the terminal member, and the sealing plate. Therefore, the description of the first embodiment applies as it is to those members of the present embodiment, and description for those members is omitted in the present embodiment.

Figure 6:
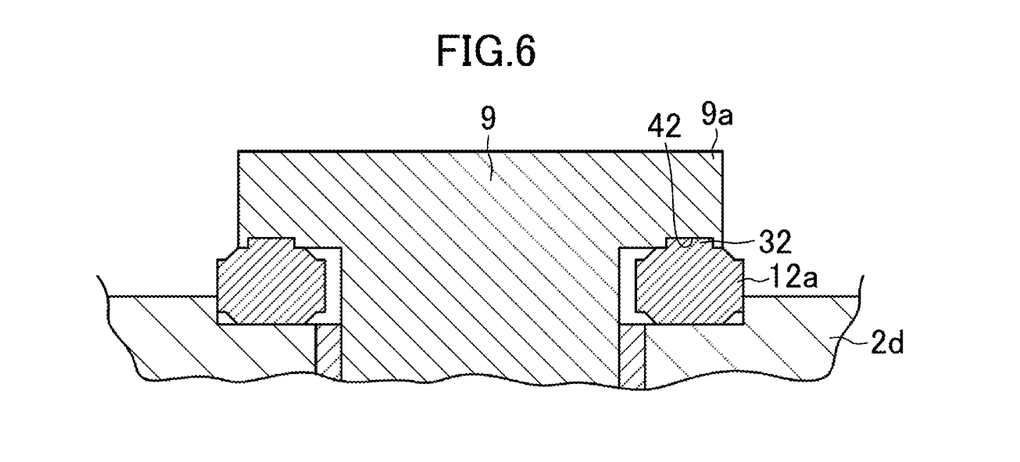
FIG. 6 is a schematic partially enlarged cross-sectional view showing fitting of a negative electrode side first insulating member, a negative electrode terminal member, and a sealing plate of another embodiment.

FIG. 6 is a schematic partially enlarged cross-sectional view showing fitting of the negative electrode side first insulating member 12a of the present embodiment, the negative electrode terminal member, and a sealing plate 2d. Similarly to the first embodiment, in the present embodiment, the negative electrode first extended part 9a of the negative electrode terminal member has two negative electrode terminal first recessed parts 42 into which the two upper side first protruding parts 32 provided to the negative electrode side first insulating member 12a are fitted. On the other hand, the sealing plate 2d and the negative electrode side first insulating member 12a of the present embodiment do not have a fitting structure, and simply contact each other on their flat surfaces.

While the sealing plate 2d and the negative electrode side first insulating member 12a of the secondary battery of the present embodiment do not have a fitting structure, the negative electrode first extended part 9a of the negative electrode terminal member and the negative electrode side first insulating member 12a have a fitting structure. Therefore, the structure achieves a rotation stopper function, and although it may not be as much as the first embodiment, the structure of the present embodiment has a sufficient anti-rotation function. Further, as in the first embodiment, the number of parts and the manufacturing processes are reduced and therefore the costs are reduced.

Third Embodiment

A secondary battery according to the third embodiment is different from the secondary battery 20 of the first embodiment only in the fitting structures of the first insulating member, the terminal member, and the sealing plate. The following therefore describes only the different parts of the structures. The structures and shapes of the secondary battery in the present embodiment are the same as those of the first embodiment except for the fitting structures of the first insulating member, the terminal member, and the sealing plate. Therefore, the description of the first embodiment applies as it is to those members of the present embodiment, and description for those members is omitted in the present embodiment.

Figure 7:
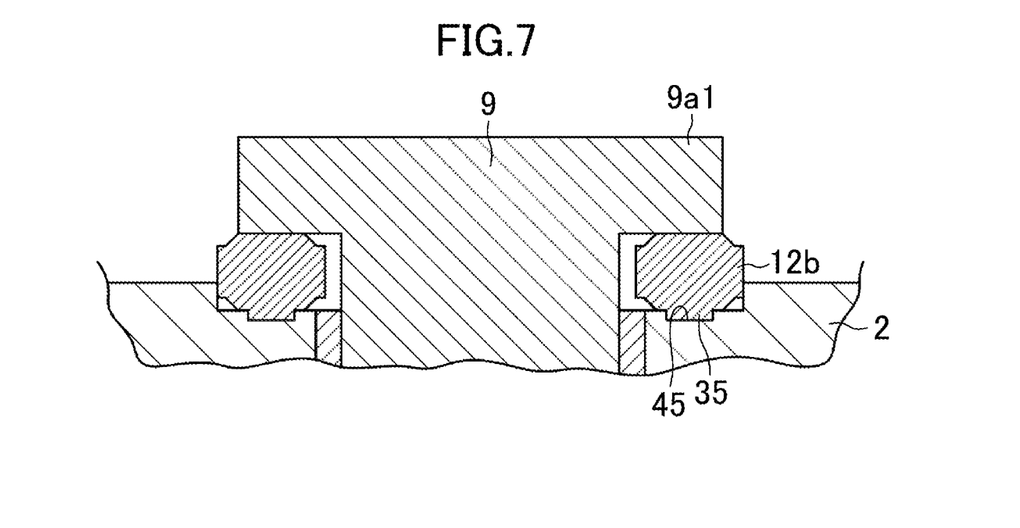
FIG. 7 is a schematic partially enlarged cross-sectional view showing fitting of a negative electrode side first insulating member, a negative electrode terminal member, and a sealing plate of another embodiment.

FIG. 7 is a schematic partially enlarged cross-sectional view showing fitting of the negative electrode side first insulating member 12b of the present embodiment, the negative electrode terminal member, and a sealing plate 2. Similarly to the first embodiment, in the present embodiment, the sealing plate 2 has, on its upper surface side, two sealing plate first recessed parts 45 into which the two lower side first protruding parts 35 provided to the negative electrode side first insulating member 12b are fitted. On the other hand, the negative electrode first extended part 9a1 of the negative electrode terminal member and the negative electrode side first insulating member 12b of the present embodiment do not have a fitting structure, and simply contact each other on their flat surfaces.

While the negative electrode first extended part 9a1 of the negative electrode terminal member and the negative electrode side first insulating member 12b of the secondary battery of the present embodiment do not have a fitting structure, the sealing plate 2 and the negative electrode side first insulating member 12b have a fitting structure. Therefore, the structure achieves a rotation stopper function, and although it may not be as much as the first embodiment, the structure of the present embodiment has a sufficient rotation stopper function. Further, as in the first embodiment, the number of parts and the manufacturing processes are reduced and therefore the costs are reduced.

Fourth Embodiment

A secondary battery according to the fourth embodiment is different from the secondary battery 20 of the first embodiment only in the fitting structures of the first insulating member, the terminal member, and the sealing plate. The following therefore describes only the different parts of the structures. The structures and shapes of the secondary battery in the present embodiment are the same as those of the first embodiment except for the fitting structures of the first insulating member, the terminal member, and the sealing plate. Therefore, the description of the first embodiment applies as it is to those members of the present embodiment, and description for those members is omitted in the present embodiment.

Figure 8:
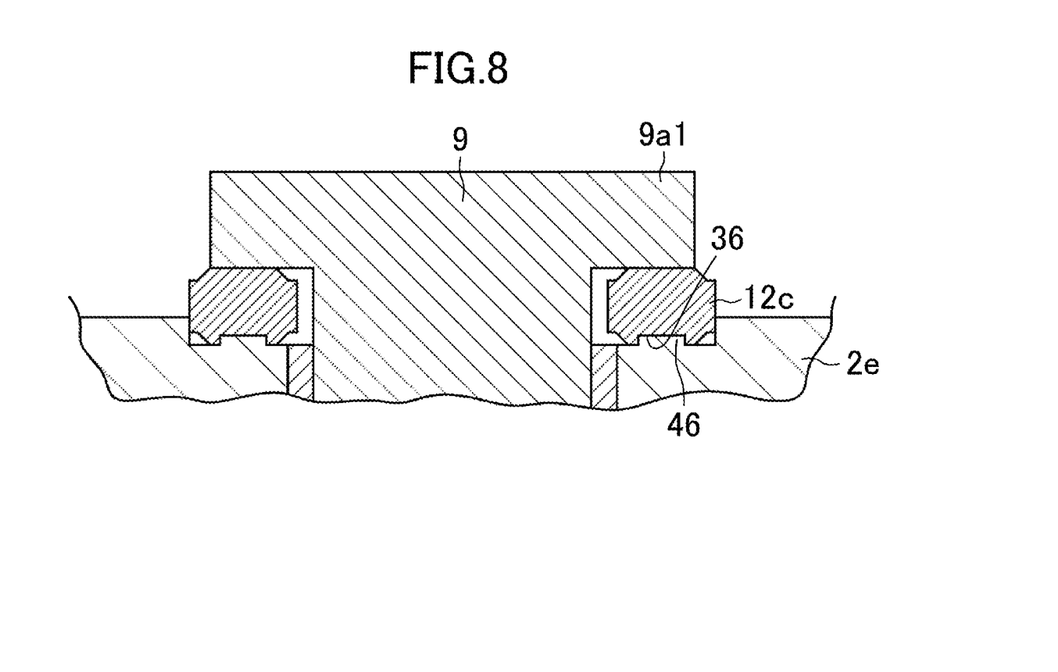
FIG. 8 is a schematic partially enlarged cross-sectional view showing fitting of a negative electrode side first insulating member, a negative electrode terminal member, and a sealing plate of another embodiment.

FIG. 8 is a schematic partially enlarged cross-sectional view showing fitting of the negative electrode side first insulating member 12c of the present embodiment, the negative electrode terminal member, and a sealing plate 2e. In the present embodiment, the sealing plate 2e has, on its upper surface side, two sealing plate second protruding parts 46 into which two lower side second recessed parts 36 provided to the negative electrode side first insulating member 12c are fitted. On the other hand, the negative electrode first extended part 9a1 of the negative electrode terminal member and the negative electrode side first insulating member 12c of the present embodiment do not have a fitting structure, and simply contact each other on their flat surfaces.

While the negative electrode first extended part 9a1 of the negative electrode terminal member and the negative electrode side first insulating member 12c of the secondary battery of the present embodiment do not have a fitting structure, the sealing plate 2e and the negative electrode side first insulating member 12c have a fitting structure. Therefore, the structure achieves a rotation stopper function, and although it may not be as much as the first embodiment, the structure of the present embodiment has a sufficient rotation stopper function. Further, as in the first embodiment, the number of parts and the manufacturing processes are reduced and therefore the costs are reduced.

Fifth Embodiment

A secondary battery according to the fifth embodiment is different from the secondary battery 20 of the first embodiment only in the fitting structures of the first insulating member, the terminal member, and the sealing plate. The following therefore describes only the different parts of the structures. The structures and shapes of the secondary battery in the present embodiment are the same as those of the first embodiment except for the fitting structures of the first insulating member, the terminal member, and the sealing plate. Therefore, the description of the first embodiment applies as it is to those members of the present embodiment, and description for those members is omitted in the present embodiment.

Figure 9:
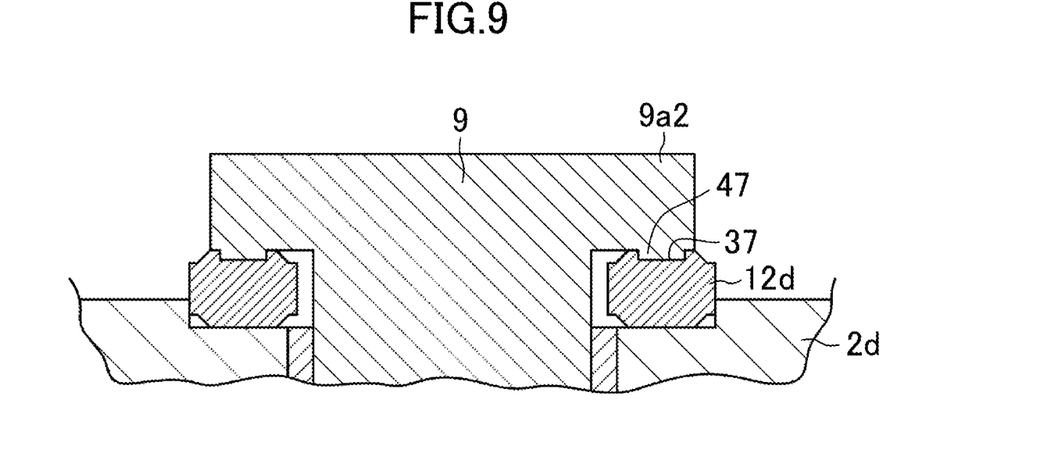
FIG. 9 is a schematic partially enlarged cross-sectional view showing fitting of a negative electrode side first insulating member, a negative electrode terminal member, and a sealing plate of another embodiment.

FIG. 9 is a schematic partially enlarged cross-sectional view showing fitting of the negative electrode side first insulating member 12d of the present embodiment, the negative electrode terminal member, and a sealing plate 2d. In the present embodiment, the negative electrode first extended part 9a2 of the negative electrode terminal member has two negative electrode terminal second protruding parts 47 into which the two upper side second recessed parts 37 provided to the negative electrode side first insulating member 12d are fitted. On the other hand, the sealing plate 2d and the negative electrode side first insulating member 12d of the present embodiment do not have a fitting structure, and simply contact each other on their flat surfaces.

While the sealing plate 2d and the negative electrode side first insulating member 12d of the secondary battery of the present embodiment do not have a fitting structure, the negative electrode first extended part 9a2 of the negative electrode terminal member and the negative electrode side first insulating member 12d have a fitting structure. Therefore, the structure achieves a rotation stopper function, and although it may not be as much as the first embodiment, the structure of the present embodiment has a sufficient rotation stopper function. Further, as in the first embodiment, the number of parts and the manufacturing processes are reduced and therefore the costs are reduced.

Sixth Embodiment

A secondary battery according to the sixth embodiment is different from the secondary battery 20 of the first embodiment only in the fitting structures of the first insulating member, the terminal member, and the sealing plate. The following therefore describes only the different parts of the structures. The structures and shapes of the secondary battery in the present embodiment are the same as those of the first embodiment except for the fitting structures of the first insulating member, the terminal member, and the sealing plate. Therefore, the description of the first embodiment applies as it is to those members of the present embodiment, and description for those members is omitted in the present embodiment.

Figure 10:
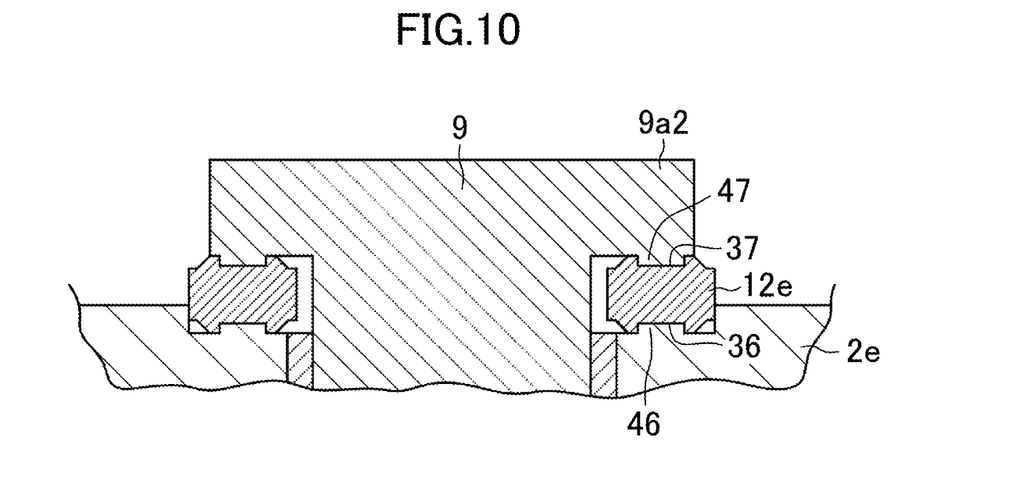
FIG. 10 is a schematic partially enlarged cross-sectional view showing fitting of a negative electrode side first insulating member, a negative electrode terminal member, and a sealing plate of another embodiment.

FIG. 10 is a schematic partially enlarged cross-sectional view showing fitting of the negative electrode side first insulating member 12e of the present embodiment, the negative electrode terminal member, and a sealing plate 2e. In the present embodiment, the negative electrode first extended part 9a2 of the negative electrode terminal member has two negative electrode terminal second protruding parts 47 into which the two upper side second recessed parts 37 provided to the negative electrode side first insulating member 12d are fitted. Further, the sealing plate 2e has, on its upper surface side, two sealing plate second protruding parts 46 into which two lower side second recessed parts 36 provided to the negative electrode side first insulating member 12e are fitted.

In the secondary battery of the present embodiment, the negative electrode first extended part 9a2 of the negative electrode terminal member and the negative electrode side first insulating member 12e have a fitting structure, and the sealing plate 2 and the negative electrode side first insulating member 12e also have a fitting structure. Therefore, the structure of the present embodiment has a rotation stopper function as is achieved by the first embodiment. Further, as in the first embodiment, the number of parts and the manufacturing processes are reduced and therefore the costs are reduced.

Seventh Embodiment

A secondary battery according to the seventh embodiment is different from the secondary battery 20 of the first embodiment only in the structures nearby the fitting structures of the first insulating member, the terminal member, and the sealing plate. The following therefore describes only the different parts of the structures. The structures and shapes of the secondary battery in the present embodiment are the same as those of the first embodiment except for the structures nearby the fitting structures of the first insulating member, the terminal member, and the sealing plate. Therefore, the description of the first embodiment applies as it is to those members of the present embodiment, and description for those members is omitted in the present embodiment.

Figure 11:
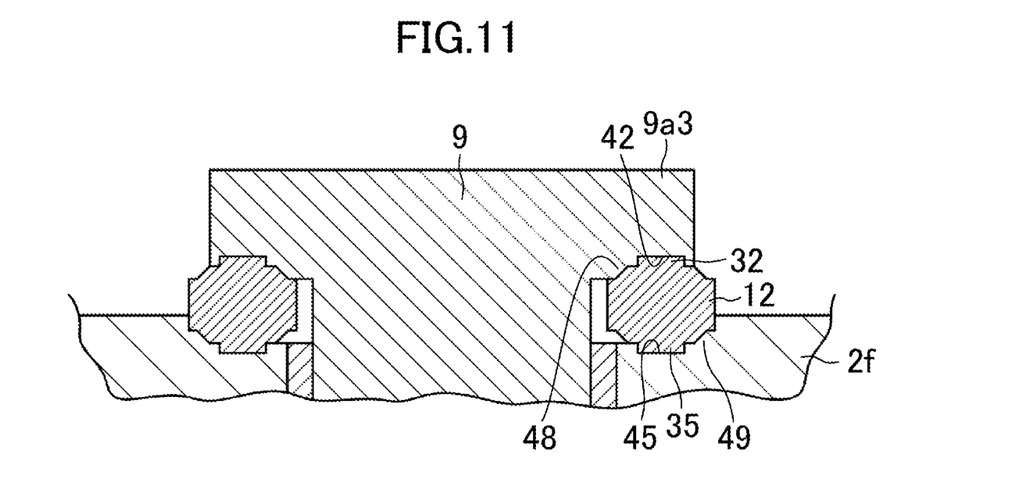
FIG. 11 is a schematic partially enlarged cross-sectional view showing fitting of a negative electrode side first insulating member, a negative electrode terminal member, and a sealing plate of another embodiment.

In the present embodiment, as shown in FIG. 11, the negative electrode first extended part 9a3 of the negative electrode terminal member has two negative electrode terminal first recessed parts 42 into which the two upper side first protruding parts 32 provided to the negative electrode side first insulating member 12 are fitted. Further, the sealing plate 2f has, on its upper surface side, two sealing plate first recessed parts 45 into which the two lower side first protruding parts 35 provided to the negative electrode side first insulating member 12 are fitted.

Further, the negative electrode first extended part 9a3 has a first contact part 48 that contacts, in a surface-to-surface manner, with a portion adjacent to the upper side first protruding part 32 of the negative electrode side first insulating member 12 (a sloped portion so-called shoulder). Further, the sealing plate 2 has a second contact part 49 that contacts, in a surface-to-surface manner, with a portion adjacent to the lower side first protruding part 35 of the negative electrode side first insulating member 12 (a sloped portion so-called shoulder).

The secondary battery of the present embodiment has the same fitting structures of the first insulating member 12, the terminal member, and the sealing plate 2f as in the case of the first embodiment, and further has the first contact part 48 and the second contact part 49 as described above. Therefore, the structure of the present embodiment has a higher rotation stopper function than the first embodiment. Further, as in the first embodiment, the number of parts and the manufacturing processes are reduced and therefore the costs are reduced.

OTHER EMBODIMENTS

The above-described embodiments are examples of the present disclosure, and the present disclosure is not limited to these examples. Well-known techniques, commonly used techniques, and publicly known techniques may be combined or partially replaced in these examples. Further, the present disclosure encompasses any modification easily conceivable by a person with ordinary skill in the art.

Although the above embodiments each describe the structure on the negative electrode side, the positive electrode side may also have the same fitting structures.

The above-described embodiments each deal with an example where the first extended part of the terminal member is arranged as a flange part extending like a brim toward the outer side of the power storage device, and an end portion of the terminal member is crimped to the current collector on the inner side of the power storage device. However, the present disclosure is not limited to such a form. For example, the terminal member may have a first terminal member that is arranged and extends like a brim toward the outer side of the power storage device and a second terminal member that passes through a through hole provided to the sealing plate. In this case, for example, a through hole may be provided to the first terminal member, and into this through hole, the second terminal member may be inserted. An outer side end portion of the second terminal member may be crimp-connected to the first terminal member, and an inner side end portion of the second terminal member may be connected to the current collector. In this case, the first terminal member serves as the first extended part. Further, the second terminal member and the current collector may be connected only by welding, or the second terminal member and the current collector may be one piece. Further, the first terminal member and the second terminal member may be connected by welding, instead of crimping.

The second insulating member arranged on the inner side of the secondary battery may also have a similar fitting structure as the first insulating member. Specifically, the fitting structure may be such that a third protruding part provided to the second insulating member fits with a third recessed part provided to at least one of the sealing plate or the current collector, or such that a fourth recessed part provided to the second insulating member fits with a fourth protruding part provided to at least one of the sealing plate or the current collector, or a combination of both structures. Further, in a case where the sealing plate and the terminal member directly face each other, a fitting structure of the terminal member and the second insulating member may be provided, instead of the fitting structure with the current collector. These fitting structures may be provided only on the negative electrode side, only on the positive electrode side, or both on the positive electrode side and the negative electrode side.

The electrode body is not limited to a stacked electrode body in which a plurality of positive electrode plates and a plurality of negative electrode plates are alternately stacked with separators interposed therebetween. The electrode body may be such that the positive electrode plate and the negative electrode plate interposing a separator therebetween are wound. In a case of such a wound electrode body, the winding axis of the electrode body may extend in the vertical direction or in the horizontal direction, while the sealing plate is positioned above. Further, a plurality of electrode bodies may be provided in a single power storage device. Further, the power storage device is not limited to a secondary battery, and may be a capacitor.

On the inner surface side of the sealing plate, the second insulating member may be arranged between the second extended part of the terminal member and the sealing plate.

The electrolyte used may be either liquid or solid.

DESCRIPTION OF REFERENCE CHARACTERS

1 Outer Case
2, 2d, 2e, 2f Sealing Plate
3 Electrode Body
6 Positive Electrode Current Collector
7a Positive Electrode First Extended Part
7b Positive Electrode Second Extended Part
8 Negative Electrode Current Collector
9a, 9a1, 9a2 Negative Electrode First Extended Part
9b Negative Electrode Second Extended Part
10 Positive Electrode Side First Insulating Member
12, 12a, 12b, 12c, 12d Negative Electrode Side First Insulating Member
19 Positive Electrode Side Second Insulating Member
20 Secondary Battery (Power Storage Device)
21 Negative Electrode Side Second Insulating Member
30, 32 Upper Side First Protruding Part
34 Insertion Hole
35 Lower Side First Protruding Part
36 Lower Side Second Recessed Part
37 Upper Side Second Recessed Part
42 Negative Electrode Terminal First Recessed Part
45 Sealing Plate First Recessed Part
46 Sealing Plate Second Protruding Part
47 Negative Electrode Terminal Second Protruding Part

The invention claimed is:

1. A terminal structure to be adopted for a power storage device comprising an outer case that has an opening and accommodates therein an electrode, the structure comprising:
   a sealing plate sealing the opening;
   a terminal member inserted into a terminal hole formed in the sealing plate and electrically connected to the electrode; and
   a ceramic-made first insulating member arranged between and electrically insulating the sealing plate and the terminal member from each other, wherein:
   the first insulating member is arranged on an outer surface side of the sealing plate facing an outer side of the power storage device,
   the terminal member has a first extended part extending further outward than an outer periphery of the terminal hole on the outer side of the power storage device,
   a first recessed part is provided to the first insulating member and a first protruding part is provided to the sealing plate or to the first extended part,
   the first recessed part provided to the first insulating member and the first protruding part provided to the sealing plate or to the first extended part fit with each other,
   an empty space is provided between the first insulating member and the terminal member,
   when viewed in a cross-sectional view, the first insulating member has a first surface facing the terminal member, a second surface opposite to the first surface and facing the sealing plate, a first side surface facing the empty space, a second side surface opposite to the first side surface, and a sloped portion is disposed between adjacent surfaces of the first insulating member, and
   the first recessed part is provided to the first surface or the second surface of the first insulating member.

2. The terminal structure of claim 1, wherein the first insulating member has a hole into which the terminal member is inserted.

3. The terminal structure of claim 1, wherein
   the electrode and the terminal member are electrically connected to each other via a current collector,
   on an inner surface side of the sealing plate facing the inner side of the power storage device, a ceramic-made second insulating member is arranged between the current collector and the sealing plate and electrically insulating the current collector and the sealing plate from each other, and
   the terminal structure further comprises a second recessed part provided to the sealing plate, and
   the second insulating member fits into the second recessed part.

4. A power storage device having the terminal structure of claim 1.

5. The terminal structure of claim 1, wherein
   the electrode and the terminal member are electrically connected to each other via a current collector,
   on an inner surface side of the sealing plate facing the inner side of the power storage device, a ceramic-made second insulating member is arranged between one of the terminal member or the current collector and the sealing plate and electrically insulating the one of the terminal member or the current collector and the sealing plate from each other, and the terminal structure further comprises a recessed part provided to the second insulating member and a protruding part provided to the sealing plate or one of the terminal member or the current collector, and the recessed part and the protruding part fit with each other.

6. The terminal structure of claim 1, wherein the electrode comprises an electrode body and an electrode current collector, and the electrode current collector as a whole is disposed between the electrode body and the sealing plate.

7. The terminal structure of claim 3, wherein:

the terminal structure further comprises a third recessed part provided to the current collector, and the second insulating member fits into the third recessed part.

8. The terminal structure of claim 3, wherein an empty space is provided between the second insulating member and the terminal member.

9. The terminal structure of claim 1, wherein:

the terminal member has a body part from which the first extended part extends, and the body part is made of copper or a copper alloy and the first extended part is made of aluminum or an aluminum alloy.

10. A terminal structure to be adopted for a power storage device comprising an outer case that has an opening and accommodates therein an electrode, the structure comprising:

a sealing plate sealing the opening;

a terminal member inserted into a terminal hole formed in the sealing plate and electrically connected to the electrode; and a ceramic-made first insulating member arranged between and electrically insulating the sealing plate and the terminal member from each other, wherein:

the first insulating member is arranged on an outer surface side of the sealing plate facing an outer side of the power storage device, the terminal member has a first extended part extending further outward than an outer periphery of the terminal hole on the outer side of the power storage device, a first protruding part is provided to the first insulating member and a first recessed part is provided to the sealing plate or to the first extended part, the first protruding part provided to the first insulating member and the first recessed part provided to the sealing plate or to the first extended part fit with each other, an empty space is provided between the first insulating member and the terminal member, when viewed in a cross-sectional view, the first insulating member has a first surface facing the terminal member, a second surface opposite to the first surface and facing the sealing plate, a first side surface facing the empty space, a second side surface opposite to the first side surface, and a sloped portion is disposed between adjacent surfaces of the first insulating member, and the first protruding part is provided to the first surface or the second surface of the first insulating member.

11. The terminal structure of claim 1, wherein the first side surface, the sloped portion disposed between the first surface and the first side surface, and the sloped portion disposed between the second surface and the first side surface form a boundary of the empty surface.

12. The terminal structure of claim 10, wherein the first side surface, the sloped portion disposed between the first surface and the first side surface, and the sloped portion disposed between the second surface and the first side surface form a boundary of the empty surface.

13. The terminal structure of claim 10, wherein the terminal member is in contact with the sloped portion disposed between the first surface and the first side surface of the first insulating member.

* * * * *